United States Patent [19]

Scanlon et al.

[11] Patent Number: 4,817,853

[45] Date of Patent: Apr. 4, 1989

[54] COMPOSITE, METHOD OF FORMING A COMPOSITE, AND ARTICLE OF MANUFACTURE

[75] Inventors: John F. Scanlon, Roscoe; Thomas A. Bolgert; David W. Okey, both of Rockford; William D. Sherman, Genoa, all of Ill.

[73] Assignee: Sundstrand Corporation, Rockford, Ill.

[21] Appl. No.: 936,640

[22] Filed: Nov. 26, 1986

[51] Int. Cl.$^4$ .............................................. B23K 31/00
[52] U.S. Cl. ..................................... 228/121; 228/122; 228/124; 228/160; 228/175; 428/608; 428/937; 428/246; 428/418; 384/276; 384/911; 384/912; 156/232; 156/246
[58] Field of Search ............... 228/120, 121, 122, 124, 228/175, 161, 160, 189; 164/97, 46; 428/626, 608, 634, 937, 246, 418, 408, 367; 384/625, 276, 909, 911, 912; 156/232, 246

[56] References Cited

U.S. PATENT DOCUMENTS

| | | | |
|---|---|---|---|
| 1,716,833 | 6/1929 | Rich | 164/112 |
| 3,084,064 | 4/1963 | Cowden et al. | 117/71 |
| 3,206,264 | 9/1965 | Dalzell et al. | 384/911 |
| 3,421,972 | 1/1969 | Cromwell et al. | 428/626 |
| 3,720,257 | 3/1973 | Beutler et al. | 164/75 |
| 3,771,977 | 11/1973 | Liu | 428/626 |
| 3,833,402 | 9/1974 | Elban et al. | 117/46 CA |
| 4,023,252 | 5/1977 | Levinstein et al. | 428/650 |
| 4,502,092 | 2/1985 | Banninck, Jr. et al. | 244/1 A |

FOREIGN PATENT DOCUMENTS

| | | | |
|---|---|---|---|
| 728870 | 3/1966 | Canada | 156/246 |
| 93139 | 6/1982 | Japan | 428/626 |
| 10463 | 1/1984 | Japan | 164/97 |
| 24622 | 2/1984 | Japan | 156/246 |
| 35936 | 2/1984 | Japan | 428/626 |

Primary Examiner—Nicholas P. Godici
Assistant Examiner—Samuel M. Heinrich
Attorney, Agent, or Firm—Wood, Dalton, Phillips, Mason & Rowe

[57] ABSTRACT

In order to accommodate post-manufacturing, or secondary operations in precision assemblies using composite materials, where the secondary operations consist of drilling, machining, grinding, lapping, or other material-removing processing, without the need to resort to expensive diamond tooling and while maintaining needed structural integrity, a composite formed of a base material, a matrix, and a machineable material is provided. The matrix is bonded to the base material and the machineable material is rendered integral with the matrix and sufficiently thick to accommodate subsequent material-removing processing to a precision dimension. By utilizing the composite, method of forming the composite, and article of manufacture, it is possible to take advantage of the characteristics of high strength and light weight even in precision assemblies due to the fact that the machineable surface is not required for structural integrity, and the machineable surface can be applied for initial machining or other material-removing processing and reapplied for subsequent machining or other material-removing processing to restore worn or damaged surfaces.

39 Claims, 2 Drawing Sheets

COMPOSITE, METHOD OF FORMING A COMPOSITE, AND ARTICLE OF MANUFACTURE

FIELD OF THE INVENTION

The present invention generally relates to composites and, more particularly, to a composite, a method of forming a composite, and an article of manufacture.

BACKGROUND OF THE INVENTION

In recent years, composites have found many applications in structural parts. Their practical use in precision assemblies, however, requires post-manufacturing, or secondary operations. Among these operations are drilling, machining, grinding, lapping, and other material-removing processes.

Generally speaking, it is difficult to perform these material-removing processes with composites. The high hardness characteristic of such materials frequently requires expensive diamond tooling. In addition, machining away layers of a composite will frequently remove needed structural integrity.

For this reason, there is a need for a sacrificial interface layer of material not needed for its structural characteristics. Moreover, it is recognized that there is a need for being able to conveniently and economically repair or rework a surface of a composite even after it has been machined since such materials conventionally require elaborate surface preparation, extraordinary measures to apply pressure, reheating and extremely careful lay-up to restore a worn or damaged surface. Even with such surface preparation and extraordinary measures, contamination can make repair or rework procedures unreliable at best.

Among the efforts to provide a metal matrix composite is that disclosed in Elban et al U.S. Pat. No. 3,833,402, issued Sept. 3, 1974. Elban et al disclose a graphite fiber treatment comprised of depositing a metal-containing compound on a graphite fiber and decomposing the metal containing compound at elevated temperatures in an inert atmosphere. However, while providing a matrix for a composite, there is no suggestion of providing a composite having a machineable surface.

A similar attempt to provide carbon fiber-reinforced metal is disclosed in Beutler et al U.S. Pat. No. 3,720,257, issued Mar. 13, 1973. Beutler et al discloses a method in which carbon fibers are coated with nickel, the coated fibers are combined with metal heated in a crucible under a vacuum, and the coated fibers and heated metal are allowed to solidify. Once again, though, Beutler et al fail to suggest a composite having a machineable surface.

Levinstein et al U.S. Pat. No. 4,023,252, issued May 17, 1977, is directed to a mixture of a plurality of powdered materials in specific percentages. The mixture includes an aluminum-copper solid solution alloy powder and a nickel-graphite powder. With these powdered materials, Levinstein et al provide a wear layer consisting of an abradable coating rather than a composite having a machineable surface.

Similarly, Cowden et al U.S. Pat. No. 3,084,064, issued Apr. 2, 1963, is directed to an abradable metal coating in the form of a wear layer. The coating is applied directly to a base material and flakes off in powder form when subjected to high forces along its surface. As a result, Cowden et al fail to suggest a composite having a surface machineable to a precision dimension but depends instead on the "wearing in" of components through abrasion.

The present invention is directed to overcoming the above stated problems and accomplishing the stated objects.

SUMMARY OF THE INVENTION

It is the principal object of the present invention to provide a composite having a machineable surface. Also, it is an object of the invention to provide a method of forming a composite having a machineable surface. It is likewise an object of the invention to provide an article of manufacture formed of a composite having a machineable surface.

An exemplary embodiment of the invention achieves the foregoing objects in a composite, method, and article of manufacture having a plurality of material layers.

The composite includes a first layer formed of a base material and a second layer formed of a matrix bonded to the base material of the first layer. A third layer formed of a machineable material is integral with the matrix and sufficiently thick to accommodate subsequent machining to a precision dimension. Preferably, the machineable material is a metallic material applied to the matrix by flame spraying, plasma spraying, or ion beam techniques. Additionally, the bonding may be accomplished through metallization by any of several commercially available processes, which rely on a low surface tension metal coating.

Additionally, the base material is suitably any of a number of materials such as a composite graphite/epoxy and the matrix is formed of nickel-coated graphite fibers. The fibers are advantageously formed into a woven cloth-like fabric that can be bound to the base material by epoxy. With this arrangement, the machineable material can be any of a number of materials such as a composite aluminum/bronze.

In the method of the invention, the first step is to provide a first layer formed of a base material and a second layer formed as a matrix. The matrix is then bonded to the base material and a third layer formed of a machineable material is provided. Finally, the method includes the step of applying the machineable material to the matrix sufficiently thick to accommodate subsequent machining to a precision dimension.

Preferably, the method also includes the steps of providing a peel ply to a surface of the matrix layer before bonding an opposite surface of the matrix layer to the base layer. It may then also include the step of removing the peel ply from the surface of the matrix layer after the opposite surface of the matrix layer has been bonded to the base layer to expose the surface for the machineable layer applying step. Alternatively, the matrix layer can be formed onto a tool, the machineable layer can be applied to a surface of the matrix layer, the matrix layer can be removed from the tool, and thereafter the matrix layer can be bonded to the base layer.

As for the article of manufacture, it includes a housing formed of a base material with a least a portion of the base material defining a base layer, and a matrix layer is bonded to the base layer prior to application of a machineable material thereto. Finally, the article of manufacture includes a machineable material integral with the matrix layer to form a machineable surface sufficiently thick to accommodate subsequent machining to a precision dimension.

Other objects, advantages and features of the present invention will become apparent from the following specification taken in conjunction with the accompanying drawings.

DESCRIPTION OF THE PREFERRED EMBODIMENTS

Figure 1:
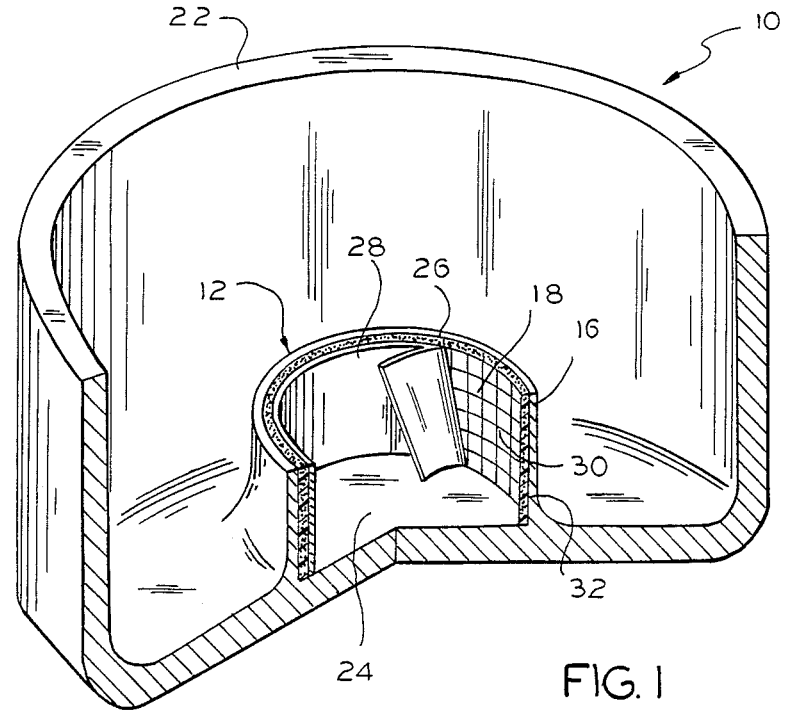
FIG. 1 is a perspective view, partially cut-away and with a machineable layer removed, of an article of manufacture utilizing the composite and method of the present invention.

An exemplary embodiment of an article of manufacture utilizing a composite and method in accordance with the invention is illustrated in FIG. 1. The article of manufacture 10 utilizes a unique composite as at 12 (see FIG. 2) having a machineable surface 14, and the composite 12 includes a first layer 16 formed of a base material and a second layer 18 formed of a matrix bonded to the base material 16. In addition, the composite 12 includes a third layer 20 formed of a machineable material integral with the matrix 18 and sufficiently thick to accommodate subsequent machining to a precision dimension.

In a preferred embodiment, the base material is also a composite such as graphite/epoxy. It is also highly desirable for the matrix 18 to be formed of nickel-coated graphite fibers formed into a woven cloth-like fabric. With these materials, The machineable material 20 is preferably a composite such as aluminum/bronze.

Figure 2:
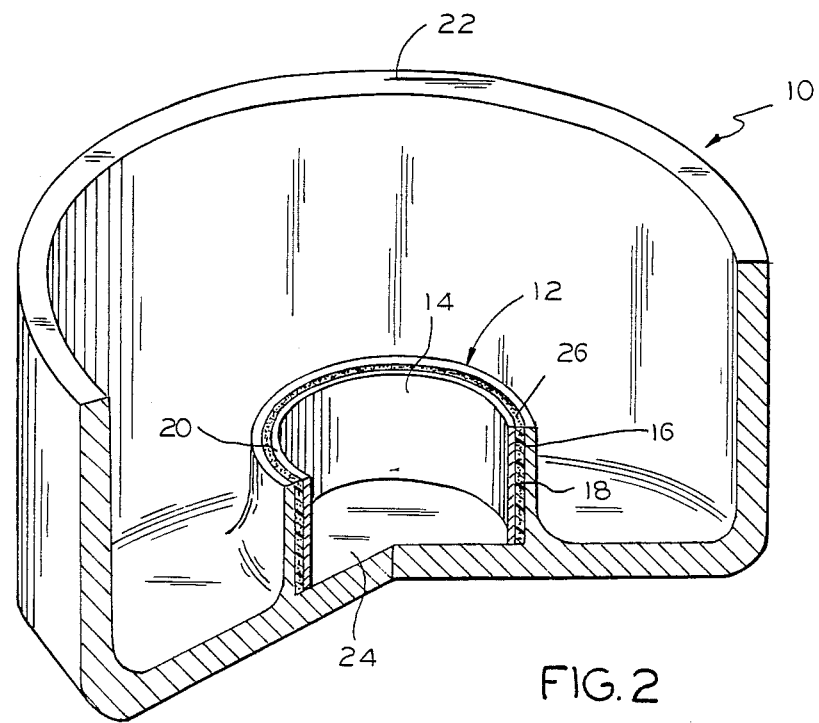
FIG. 2 is a perspective view, partially cut-away but with the machineable layer in place, of an article of manufacture utilizing the composite and method of the present invention.

Referring to FIG. 2, the article of manufacture 10 includes a housing 22 also formed of a material such as graphite/epoxy composite. At least a portion of the material forming the housing 22 comprises the base layer 16 which, in the article of manufacture 10, defines a bearing-receiving opening 24 which is generally cylindrical in shape and concentric with the remainder of the housing 22. With this arrangement, the matrix layer 18 is bonded to the base layer 16 by suitable means such as epoxy as at 26.

In order to form the composite 12 utilized in the article of manufacture 10, the method includes the steps of providing a first or base layer 16 formed of the base material and a second or matrix layer 18 formed of the woven cloth-like fabric. The woven cloth-like fabric of the matrix layer 18 is then bonded to the base material of the base layer 16 by suitable means such as epoxy. In addition, a third layer 20 formed of a machineable material is provided. The machineable material of the third layer 20 is then applied to the woven cloth-like fabric of the matrix layer 18 to complete the formation of the composite 12. More specifically, the machineable material of the third layer 20 is applied sufficiently thick to accommodate subsequent machining of the machineable surface 14 to a precision dimension.

Still further details of the method include the machineable material being a metallic material such as an aluminum/bronze composite applied to the matrix layer 18 by means of flame spraying, plasma spraying, ion beam techniques, or coating or lamination. When so applied, the machineable surface 14 can be machined, i.e., it can be subjected to any of a number of post-manufacturing or secondary operations including drilling, machining, grinding, lapping, or other material-removing processing, in order to achieve a precision dimension.

Figure 3:
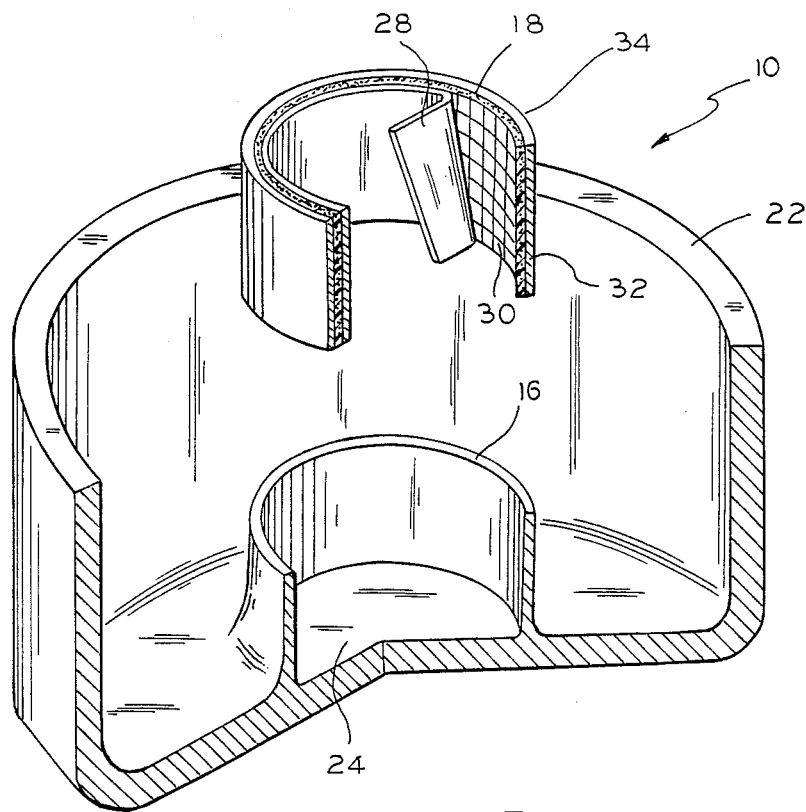
FIG. 3 is a perspective view illustrating the application of a machineable layer to a matrix layer before bonding the matrix layer to a base layer.

Preferably, the method also includes the steps of providing a peel ply 28 to a surface 30 of the matrix layer 18 and thereafter bonding an opposite surface 32 of the matrix layer 18 to the base layer 16. The peel ply 28 is then removed from the surface 30 of the matrix layer 18 after the opposite surface 32 of the matrix layer 18 has been bonded to the base layer 16 to expose the surface 30 for the machineable layer applying step. Alternatively, the matrix layer 18 can be formed onto a tool 34 (see FIG. 3), the machineable layer 20 can be applied to the surface 30 of the matrix layer 18, the matrix layer 18 can be removed from the tool 34 after applying the machineable layer 20, and the matrix layer 18 can thereafter be bonded to the base layer 16.

With the present invention, the machineable layer 20 can be worked by drilling, machining, grinding, lapping, or other material-removing processing. In other words, the machineable layer 20 comprises a sacrificial interface layer of material which is not needed for structural integrity of the overall composite 12, and it does not require elaborate surface preparations or extraordinary measures to apply. As a result, the machineable layer 20 can be applied and machined to a precise dimension and can be reapplied and remachined to restore a worn or damaged surface 14.

As should now be appreciated, the nickel plating on the graphite fibers provides an interface between the graphite fibers and the machineable layer. Alternatively, an ion beam implanted metallic surface can be substituted for the nickel to act as an interface between the graphite/epoxy material and a subsequently applied metallic coating. On the non-machined side of the matrix layer an epoxy or other addition-polymerization resin can be used to infiltrate the plated fibers and bond the matrix layer formed thereby to the inside of a housing or other base layer. Once the layers of the composite have been formed as described, any machining or rework is done directly on metal thereby avoiding the difficulties of machining composite fibers.

Finally, it will be appreciated that the bond between the layers is extremely strong. The epoxy serves to render the matrix layer essentially integral with the base material and, to the extent the epoxy penetrates the woven cloth-like fabric defined by the nickel-plated graphite fibers, it will also bond the machineable material applied to the matrix layer by means of flame spraying, plasma spraying, ion beam techniques, or other techniques. For this reason, the composite is rendered essentially integral after its formation.

While in the foregoing there have been set forth preferred embodiments of the invention, it is to be understood that the invention is only to be limited by the spirit and scope of the appended claims.

We claim:

1. A composite having a machineable surface, comprising:
   a first layer formed of a non-metallic base material and a second layer formed of a metal-coated matrix bonded to said non-metallic base material of said first layer; and
   a third layer formed of a machineable metallic material integral with said matrix and sufficiently thick to accommodate subsequent machining to a precision dimension.

2. The composite as defined by claim 1 wherein said non-metallic base material is a composite graphite/epoxy.

3. The composite as defined by claim 1 wherein said metal-coated matrix is formed of metal-coated graphite fibers.

4. The composite as defined by claim 1 wherein said metal-coated matrix is formed of nickel coated graphite fibers.

5. The composite as defined by claim 4 wherein said nickel-coated graphite fibers are formed into a woven cloth-like fabric.

6. The composite as defined by claim 1 wherein said machineable metallic material is a composite aluminum/bronze.

7. The composite as defined by claim 1 wherein said machineable metallic material is applied to said metal-coated matrix by flame spraying.

8. The composite as defined by claim 1 wherein said machineable metallic material is applied to said metal-coated matrix by plasma spraying.

9. The composite as defined by claim 1 wherein said machineable metallic material is applied to said metal-coated matrix by ion beam.

10. The composite as defined by claim 1 wherein said machineable metallic material is applied to said metal-coated matrix by lamination.

11. The composite as defined by claim 1 wherein said machineable metallic material is applied to said metal-coated matrix by coating.

12. A method of forming a composite having a machineable surface, comprising the steps of:
providing a first layer formed of a non-metallic base material and a second layer formed of a metal-coated matrix adapted to be bonded to said non-metallic base material;
bonding said metal-coated matrix to said non-metallic base material;
providing a third layer formed of a machineable metallic material adapted to be applied to said metal-coated matrix; and
applying said machineable metallic material to said metal-coated matrix;
said machineable metallic material being applied sufficiently thick to accommodate subsequent machining to a precision dimension.

13. The method of forming a composite as defined by claim 12 wherein said non-metallic base material is a composite graphite/epoxy.

14. The method of forming a composite as defined by claim 12 wherein said metal-coated matrix is formed of metal-coated graphite fibers.

15. The method of forming a composite as defined by claim 12 wherein said metal-coated matrix is formed of nickel-coated graphite fibers.

16. The method of forming a composite as defined by claim 15 wherein said nickel-coated graphite fibers are formed into a woven cloth-like fabric.

17. The method of forming a composite as defined by claim 12 wherein said machineable metallic material is a composite aluminum/bronze.

18. The method of forming a composite as defined by claim 12 wherein said machineable metallic material is applied to said metal-coated matrix by flame spraying.

19. The method of forming a composite as defined by claim 12 wherein said machineable metallic material is applied to said metal-coated matrix by plasma spraying.

20. The method of forming a composite as defined by claim 12 wherein said machineable metallic material is applied to said metal-coated matrix by lamination.

21. The method of forming a composite as defined by claim 12 wherein said machineable metallic material is applied to said metal-coated matrix by coating.

22. The method of forming a composite as defined by claim 12 wherein said machineable metallic material is applied to said metal-coated matrix by ion beam.

23. The method of forming a composite as defined by claim 12 wherein said metal-coated matrix is bonded to said non-metallic base material with epoxy.

24. A method of forming a composite having a machineable surface, comprising the steps of:
providing a base layer formed of a non-metallic base material;
providing a matrix layer formed of metal-coated graphite fibers and bonding said matrix layer to said non-metallic base layer; and
providing a machineable layer formed of metallic material and applying said machineable layer to said matrix layer.

25. The method of forming a composite as defined by claim 24 wherein said metal-coated graphite fibers are coated with nickel.

26. The method of forming a composite as defined by claim 25 wherein said non-metallic base material is a composite graphite/epoxy and said nickel-coated graphite fibers are formed as a woven cloth-like fabric.

27. The method of forming a composite as defined by claim 26 including the steps of providing a peel ply to a surface of said metal-coated matrix layer and thereafter bonding an opposite surface of said metal-coated matrix layer to said non-metallic base layer.

28. The method of forming a composite as defined by claim 27 including the step of removing said peel ply from said surface of said metal-coated matrix layer after said opposite surface of said metal-coated matrix layer has been bonded to said non-metallic base layer to expose said surface for said machineable metallic layer applying step.

29. The method of forming a composite as defined by claim 24 including the steps of forming said metal-coated matrix layer onto a tool, applying said machineable metallic layer to a surface of said metal-coated matrix layer, removing said metal-coated matrix layer from said tool after applying said machineable metallic layer, and thereafter bonding said metal-coated matrix layer to said non-metallic base layer.

30. An article of manufacture, comprising:
a housing formed of a non-metallic base material with at least a portion of said non-metallic base material defining a non-metallic base layer for a machineable surface;
a metal-coated matrix layer bonded to said non-metallic base layer defined by said non-metallic base material portion; and
a machineable metallic material integral with said metal-coated matrix layer to form said machineable metallic surface of said housing, said machineable metallic material being applied sufficiently thick to accommodate subsequent machining to a precision dimension.

31. The article of manufacture as defined by claim 30 wherein said non-metallic base material is a composite graphite/epoxy, said metal-coated matrix layer being formed of metal-coated graphite fibers, and said machineable metallic material being a composite aluminum/bronze.

32. The article of manufacture as defined by claim 31 wherein said metal-coated graphite fibers are coated with nickel.

33. The article of manufacture as defined by claim 32 wherein said nickel-coated graphite fibers of said metal-coated matrix layer are in the form of a woven cloth-like fabric.

34. The article of manufacture as defined by claim 30 wherein said machineable metallic material is applied to said metal-coated matrix layer by flame spraying.

35. The article of manufacture as defined by claim 30 wherein said machineable metallic material is applied to said metal-coated matrix layer by plasma spraying.

36. The article of manufacture as defined by claim 30 wherein said machineable metallic material is applied to said metal-coated matrix layer by ion beam.

37. The article of manufacture as defined by claim 30 wherein said machineable metallic material is applied to said metal-coated matrix layer by lamination.

38. The article of manufacture as defined by claim 30 wherein said machineable metallic material is applied to said metal-coated matrix layer by coating.

39. The article of manufacture as defined by claim 21 wherein said metal-coated matrix layer is bonded to said non-metallic base material with epoxy.

* * * * *